United States Patent
Lee et al.

(10) Patent No.: US 9,067,661 B2
(45) Date of Patent: *Jun. 30, 2015

(54) SHIP CAPABLE OF RUNNING SELECTIVELY WITH LIQUEFIED FUEL GAS MAIN DRIVE ENGINE AND LIQUEFIED FUEL GAS GENERATOR ENGINE

(71) Applicant: DAEWOO SHIPBUILDING & MARINE ENGINEERING CO., LTD., Seoul (KR)

(72) Inventors: Jin Kwang Lee, Geoge-si (KR); Dong Kyu Choi, Geoje-si (KR); Jung Han Lee, Geoje-si (KR)

(73) Assignee: DAEWOO SHIPBUILDING & MARINE ENGINEERING CO., LTD., Seoul (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,442

(22) Filed: May 30, 2014

(65) Prior Publication Data

US 2014/0260255 A1  Sep. 18, 2014

Related U.S. Application Data

(63) Continuation of application No. 13/502,365, filed as application No. PCT/KR2010/007122 on Oct. 18, 2010.

(30) Foreign Application Priority Data

Oct. 16, 2009  (KR) .................. 10-2009-0098991

(51) Int. Cl.
*B63H 21/20* (2006.01)
*B63H 21/14* (2006.01)
*B63H 21/17* (2006.01)

(52) U.S. Cl.
CPC ............... *B63H 21/20* (2013.01); *Y02T 10/36* (2013.01); *Y02T 70/5218* (2013.01); *Y02T 70/5236* (2013.01); *B63H 21/14* (2013.01); *B63H 21/17* (2013.01); *B63H 2021/205* (2013.01)

(58) Field of Classification Search
CPC ........................................ B63H 21/20
USPC .................................... 440/3, 6
See application file for complete search history.

(56) References Cited

U.S. PATENT DOCUMENTS 5,711,270 A    1/1998  Pedersen
6,978,617 B2 * 12/2005  Goldmeer et al. ............. 60/698

(Continued)

FOREIGN PATENT DOCUMENTS

JP    63-302169 A   12/1988
JP    05-139381 A    6/1993

(Continued)

OTHER PUBLICATIONS

International Search Report dated Oct. 18, 2010 of PCT/KR2010/007122 which is the parent application—4 pages.

(Continued)

*Primary Examiner* — Lars A Olson
*Assistant Examiner* — Jovon Hayes
(74) *Attorney, Agent, or Firm* — Knobbe Martens Olson & Bear, LLP

(57) ABSTRACT

A ship includes: a high-pressure injection engine using fuel gas as fuel to obtain a propulsion power of the ship; a generator engine using fuel gas as fuel to generate electricity; a motor generating a power by using the electricity generated from the generator engine; a propulsion propelling the ship; a main clutch connecting the high-pressure injection engine to the propulsion; an auxiliary clutch connecting the gear box to the propulsion; and a gear box disposed in a front side of the propulsion and power-connected to the main clutch and the auxiliary clutch. The high-pressure injection engine and the motor are selectively power-connected to the propulsion to obtain the propulsion power of the ship.

11 Claims, 4 Drawing Sheets

(56) References Cited

U.S. PATENT DOCUMENTS

| | | | |
|---|---|---|---|
| 7,308,889 B2 * | 12/2007 | Post et al. | 123/527 |
| 8,062,081 B2 * | 11/2011 | Barrett et al. | 440/1 |
| 2008/0190352 A1 | 8/2008 | Lee et al. | |
| 2009/0266086 A1 | 10/2009 | Lee et al. | |
| 2012/0108116 A1 * | 5/2012 | Takahira et al. | 440/6 |
| 2012/0108117 A1 * | 5/2012 | Kwon et al. | 440/6 |
| 2012/0240874 A1 | 9/2012 | Yoo et al. | |
| 2012/0252285 A1 * | 10/2012 | Lee et al. | 440/3 |

FOREIGN PATENT DOCUMENTS

| | | | |
|---|---|---|---|
| JP | 2005-219737 A | 8/2005 | |
| JP | 2008-126829 A | 6/2008 | |
| KR | 10-0396471 B1 | 11/2003 | |
| KR | 10-0742677 B1 | 7/2007 | |
| KR | 10-0804965 B1 | 2/2008 | |
| KR | 10-2008-022903 A | 3/2008 | |
| KR | 10-0922007 A | 10/2009 | |

OTHER PUBLICATIONS

Japanese Office Action dated Oct. 1, 2013 of corresponding Japanese Patent Application 2012-535117—3 pages.

* cited by examiner

SHIP CAPABLE OF RUNNING SELECTIVELY WITH LIQUEFIED FUEL GAS MAIN DRIVE ENGINE AND LIQUEFIED FUEL GAS GENERATOR ENGINE

TECHNICAL FIELD

The present invention relates to a ship for selectively driving a fuel gas main propulsion engine and a fuel gas generator engine, and more particularly, a ship for selectively driving a fuel gas main propulsion engine and a fuel gas generator engine, which obtains a propulsion power of the ship from the fuel gas generator engine at a low power, thereby saving a fuel cost and solving an environmental problem.

BACKGROUND ART

Until now, a propulsion engine which uses oil as fuel has been generally used in a merchant ship such as a container carrier or a passenger ship. Due to the recent oil price increase, however, more and more ships are employing a propulsion engine which uses liquefied fuel gas, for example, liquefied natural gas (LNG), which is much cheaper than oil. Furthermore, since the price of LNG in the summer season is 50% lower than in the winter season, LNG may be purchased and stored in the summer season. Therefore, LNG has an advantage in terms of price.

A ship engine capable of obtaining a propulsion or generation power by using LNG as fuel may include a ME-GI engine or a dual fuel(DF) engine. The ME-GI engine is referred to as a gas injection engine which compresses LNG and then injects and burns the compressed LNG. In particular, the ME-GI engine is referred to a high-pressure gas injection engine which compresses LNG, or LPG at a high pressure of 150-600 bar and then injects and burns the compressed LNG, or liquid LPG.

Such a gas injection engine has an operation structure which uses both oil (heavy fuel oil (HFO) or marine diesel oil (MDO)) and fuel gas (LNG, or LPG), and obtains a power by supplying oil to the engine at a low power (for example, less than 30% of the maximum power) and obtains a power by using both oil and fuel gas when the power level is equal to or more than 30% of the maximum power. The operation method of the gas injection engine has been disclosed in Korean Patent No. 0396471.

Such a gas injection engine has a problem in that fuel gas which is a cheap and clean energy source cannot be used at a low power. In general, a ship sails at a low power around a harbor. When the ship uses oil as an energy source at a low power, large amounts of environmental pollutant materials such as $SO_x$ and $NO_x$ are discharged. Recently, more and more countries tend to set up storing regulations against the discharge of environmental pollutant materials around a harbor.

Therefore, there is a demand for a new propulsion system which is capable of using fuel gas, which is cheap and produces small amounts of environmental pollutant materials, as fuel even at a low power.

SUMMARY

An embodiment of the present invention is directed to a ship having a propulsion system capable of using fuel gas as fuel even when the ship is operated at a low power.

According to the embodiment of the present invention, the ship includes the fuel gas main propulsion engine and the fuel gas generator engine, and obtains a propulsion power by using the electricity generated by the gas fuel generator engine, at a low power level. Therefore, it is possible to save a fuel cost and to solve an environmental problem.

Furthermore, a separate facility for treating BOG which is produced when fuel gas is gasified may not be required, and the BOG may be used as fuel gas in the main propulsion engine 10 or the generator engine 20. Therefore, the precious energy source may be reused without being discarded.

EMBODIMENTS

Figure 1:
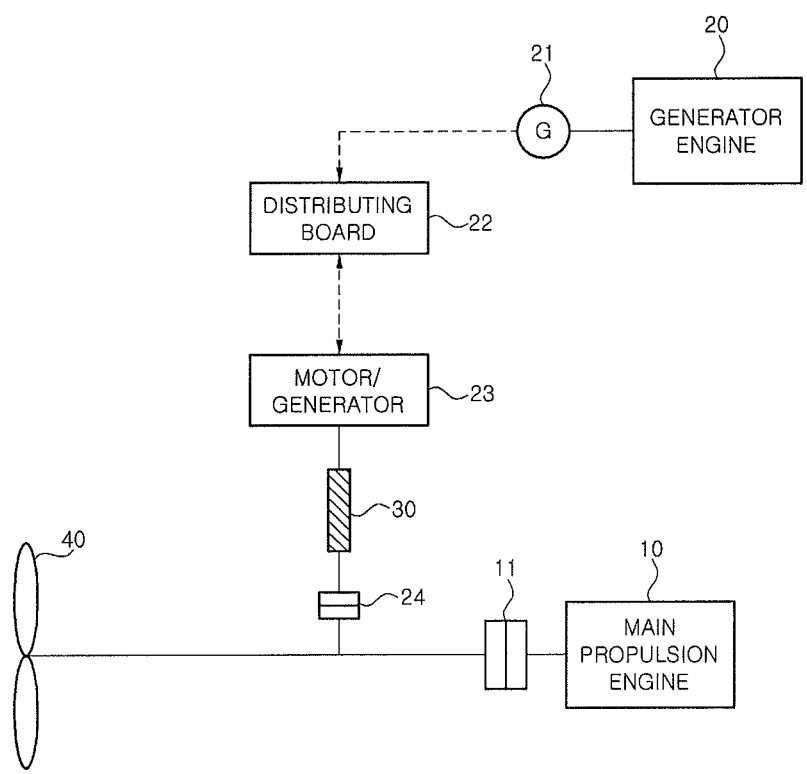
FIG. 1 is a diagram schematically illustrating a ship having a main propulsion engine and a generator engine according to an embodiment of the present invention.

According to an aspect of the present invention, a ship includes: a high-pressure injection engine using fuel gas as fuel to obtain a propulsion power of the ship; a generator engine using fuel gas as fuel to generate electricity; a motor generating a power by using the electricity generated from the generator engine; a propulsion propelling the ship; a main clutch power-connecting the high-pressure injection engine to the propulsion; an auxiliary clutch power-connecting a gear box to the propulsion. The high-pressure injection engine and the gear box are selectively power-connected to the propulsion to obtain the propulsion power of the ship.

When the ship is operated at less than a predetermined power, the high-pressure injection engine may be stopped, the power connection between the main clutch and the propulsion may be cut off, the auxiliary clutch may be power-connected to the propulsion through the gear box, and the electricity generated by the generator engine may be transmitted to the propulsion through the motor, the gear box, and auxiliary clutch to obtain the propulsion power of the ship.

The ship may further include a liquefied fuel gas storage tank storing liquefied fuel gas. Boil-off gas (BOG), which is produced when the liquefied fuel gas stored in the liquefied fuel gas storage tank is evaporated, may be used as fuel gas by the high-pressure injection engine or the generator engine.

The predetermined power may be equal to or less than 40% of the maximum power of the high-pressure injection engine.

The pressure of fuel gas supplied to the high-pressure injection engine may range from 150 to 600 bar.

The generator engine may include a dual fuel(DF) engine, a gas engine, or a gas turbine.

The motor may include a motor/generator, and a part of the power transmitted through the high-pressure injection engine may be transmitted to the motor/generator through the gear box and the auxiliary clutch in order to generate electricity.

The electricity generated by the motor/generator may be supplied to a variety of electricity consumers of the ship through a distributing board.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
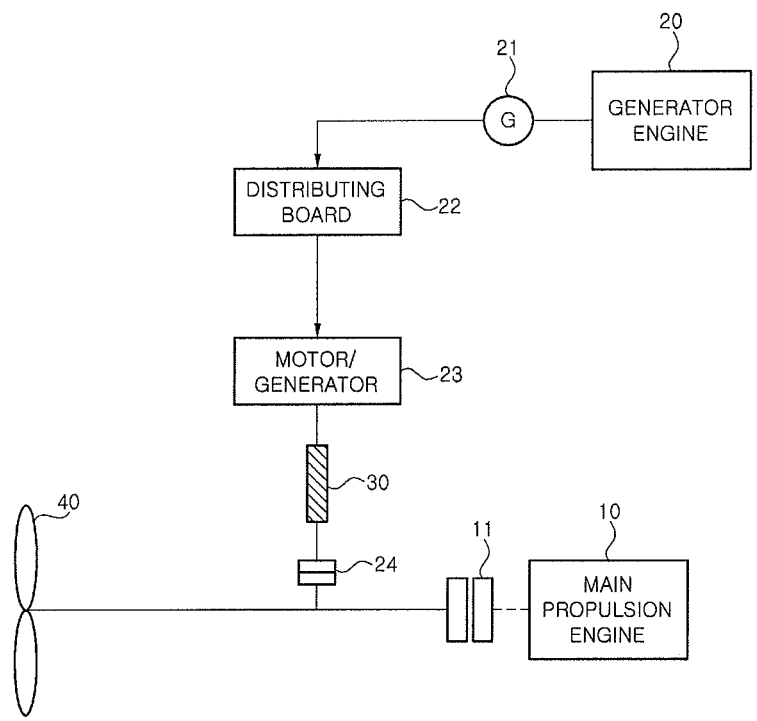
FIG. 2 is a diagram showing a state in which the main propulsion engine is not connected to a propulsion, but the propulsion is driven by the generator engine.

FIG. 1 is a diagram schematically illustrating a ship having a main propulsion engine and a generator engine according to an embodiment of the present invention. FIG. 2 is a diagram showing a state in which the main propulsion engine is not connected to a propulsion, but the propulsion is driven by the generator engine.

The ship according to the embodiment of the present invention includes a main propulsion engine 10, a generator engine 20, a propulsion 40 and so on.

The main propulsion engine 10 is a high-pressure gas injection engine which uses fuel gas to obtain a propulsion power of the ship. The pressure of the fuel gas supplied to the main propulsion engine 10 ranges from 150 to 600 bar (gauge pressure). The main propulsion engine (or the high-pressure injection engine) 10 may include an ME-GI engine, for example. The maximum power of the ME-GI engine may approach about 87 MW.

Such a main propulsion engine uses oil as fuel at less than a predetermined power, for example, at less than 40% of the maximum power thereof, or desirably, less than 30% of the maximum power, and uses both oil and fuel gas at more than the predetermined power. The main propulsion engine uses bunker C oil (HFO) or MDO.

The generator engine 20 is an engine which uses fuel gas(LNG) to generate electricity. The generator engine 20 may include a DF engine or gas turbine, for example. The pressure of fuel gas supplied to the DF engine is equal to or less than 10 bar, and the pressure of fuel gas supplied to the gas turbine ranges from 15 to 30 bar. The maximum power of the generator engine may approach 4 MW, and four generator engines may be installed at the same time. Such a generator engine may use bunker C oil or MDO as fuel.

The propulsion 40 is power-connected to the main propulsion engine 10 through a main clutch 11 or power-connected to the generator engine 20 through a auxiliary clutch 24.

Between the main propulsion engine 10 and the propulsion 40, the main clutch 11 is positioned to connect a power from the main propulsion engine 10 to the propulsion 40 or cut off the power connection.

In the rear side of the generator engine 20, a generator 21 is positioned to convert a power generated by the generator engine 20 into electricity. The electricity generated by the generator 21 may be supplied to a variety of electricity consumers of the ship through a distributing board 22.

In the rear side of the distributing board 22, a motor/generator (or motor) 23 is positioned. In the rear side of the motor/generator 23, a gear box 30 is positioned.

The auxiliary clutch 24 serves to connect a power between the gear box 30 and the propulsion 40 or cut off the power connection.

The power from the main propulsion engine 10 and the power from the generator engine 20 may be selectively transmitted to the propulsion 40 by the main clutch 11 and the auxiliary clutch 24.

For example, the main clutch 11 is power-connected at normal times such that the ship is driven by the main propulsion engine 10. During an emergency in which a trouble or the like occurs, the connection of the main clutch 11 is cut off, and the auxiliary clutch 24 is connected to transmit a power to the propulsion 40 through the motor/generator 23 by using the electricity generated by the generator engine 20.

As the ship is selectively driven by the main propulsion engine 10 and the generator engine 20, it is possible to actively deal with an emergency in which the main propulsion engine 10 is out of order.

Meanwhile, when the ship is operated at a low power level, for example, less than 30% of the maximum power of the main propulsion engine 10, the ship is operated only by oil in consideration of the engine's property. In this case, the ship cannot use fuel gas as fuel. When the ship is operated at a low power, it may correspond to a case in which the ship sails around a harbor. When the ship uses bunker C oil or MDO as fuel, large amounts of environmental pollutant materials such as $SO_x$ and $NO_x$ are discharged. Recently, more and more countries tend to set up regulations against the discharge of environmental pollutant materials around a harbor. In order to deal with such environmental regulations, when oil from which small amounts of pollutant materials are discharged is used to drive the engine of the ship, a fuel cost for the operation of the ship inevitably increases.

In this embodiment of the present invention, the ship may be selectively driven by the main propulsion engine 10 and the generator engine 20. Therefore, when the ship is operated at a low power, the main propulsion engine 10 is stopped, and the electricity generated by the generator engine 20 is transmitted to the propulsion 40 through the motor, that is, the motor/generator 23, in order to obtain a propulsion power of the ship.

Referring to FIG. 2, the connection of the main clutch 11 is cut off so that a power is not transmitted between the main propulsion engine 10 and the propulsion 40, and only the auxiliary clutch 24 is connected to rotate the motor/generator 23 by using the electricity supplied by the distributing board 22 such that the power is transmitted to the propulsion 40 through the gear box 30.

According to the above-described embodiment of the present invention, the ship may be selectively driven by the main propulsion engine 10 and the generator engine 20. When the ship is operated at a low power state, the main propulsion engine 10 which needs to use oil is stopped, and the electricity generated by the generator engine 20 using LNG which is a cheap and clean energy source may be used to drive the ship. Therefore, when the ship is operated at a low power state, a fuel cost required for driving the ship is considerably reduced, and it is possible to deal with the regulations against the discharge of environmental pollutant materials.

In the embodiment of the present invention, boil-off gas (BOG) produced when LNG is gasified may be used as fuel gas in the main propulsion engine 10 or the generator engine 20.

The liquefaction temperature of LNG is as ultra low as 163 degrees below zero at a normal pressure. Therefore, even when the temperature of LNG is slightly higher than 163 degrees below zero at a normal pressure, LNG is evaporated. Although an LNG storage tank (or a liquefied fuel gas tank) is thermally insulated, BOG is continuously produced in the tank because external heat is continuously transmitted to LNG stored in the LNG storage tank. When the BOG is continuously produced, the pressure of the LNG storage tank excessively increases. Therefore, the produced BOG is discharged to the outside of the tank and then treated by a BOG treatment facility. Such a BOG treatment facility may include a vent for discharging the BOG to the air, a gas combustion unit or a flare for burning the BOG, and a reliquefaction unit.

The amount of BOG produced in the LNG storage tank may exceed an amount to be used as fuel gas in the main propulsion engine 10. Furthermore, when the ship is operated at a low power, the ship cannot use LNG as fuel. Therefore, it is very important to treat BOG in a ship which uses LNG as fuel. Most ships discharge the BOG to the air or burn the BOG away.

The ship according to the embodiment of the present invention does not include a separate facility for treating BOG, but the BOG may be used as fuel gas in the main propulsion engine 10. When an amount of BOG which exceeds the amount to be used as fuel gas in the main propulsion engine 10 is produced, the BOG may be used as fuel gas in the generator engine 20. Therefore, since the precious energy source may be reused without being discarded, a fuel cost may decrease. Furthermore, since a separate facility for treating BOG is not required, a ship building cost may decrease.

Figure 3:
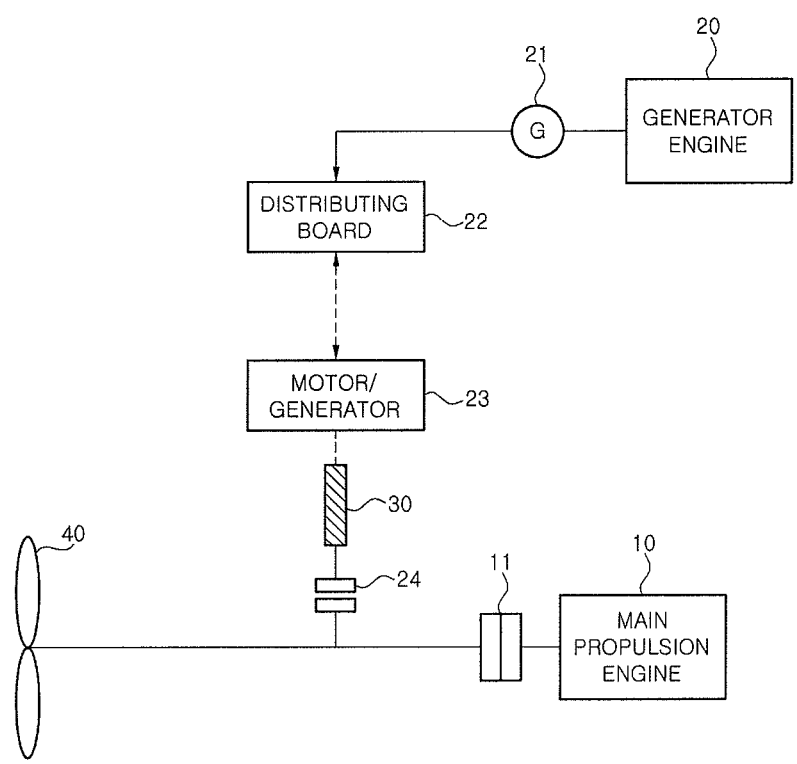
FIG. 3 is a diagram showing a case in which only a main clutch is connected and the connection of an auxiliary clutch is cut off.

FIG. 3 is a diagram showing a case in which only the main clutch is connected and the connection of the auxiliary clutch is cut off.

When the ship is normally operated, the power from the main propulsion engine 10 is transmitted to the propulsion 40 through the main clutch 11 to drive the ship. LNG, or LPG is used as the fuel gas for driving the main propulsion engine 10, and BOG may be additionally supplied to the main propulsion engine 10. Furthermore, the BOG may also be supplied to the generator engine 20 and used for the generator 21 to generate electricity.

Figure 4:
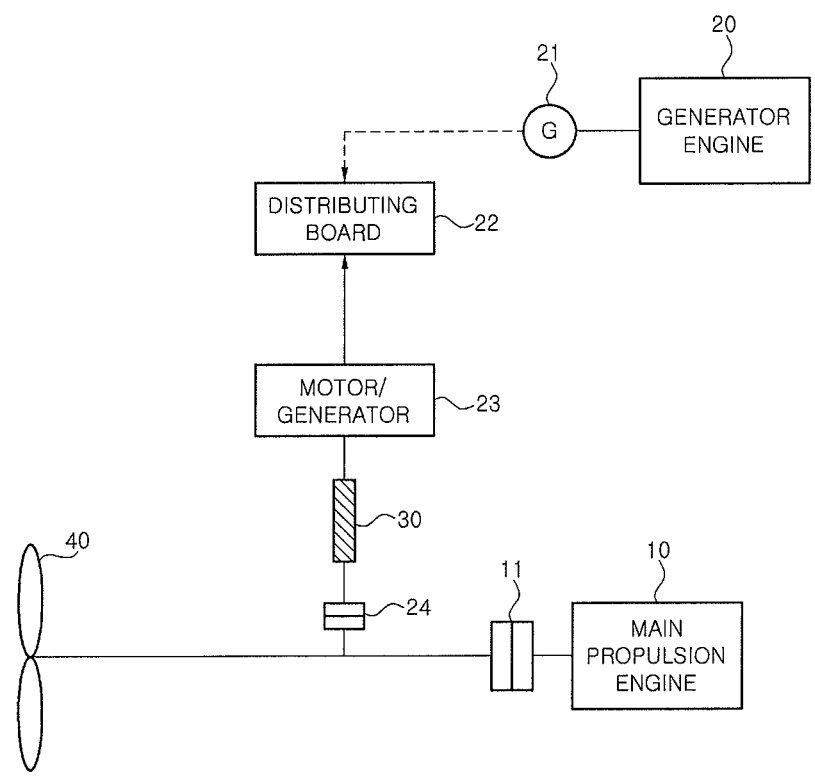
FIG. 4 is a diagram showing a case in which both of the main clutch and the auxiliary clutch are connected.

FIG. 4 is a diagram showing a case in which both of the main clutch and the auxiliary clutch are connected.

When the ship is normally operated, the power from the main propulsion engine 10 is transmitted to the propulsion 40 through the main clutch 11 to drive the ship. LNG or LPG is used as the fuel gas for driving the main propulsion engine 10, and BOG may be additionally supplied to the main propulsion engine 10. An amount of BOG which exceeds the amount required to drive the propulsion 40 may be transmitted through the gear box 30 connected to the auxiliary clutch 24 and then used for the motor/generator 23 to generate electricity. The electricity generated by the motor/generator 23 may be collected by the distributing board 22 and then supplied to a variety of electricity consumers of the ship.

According to the embodiment of the present invention, the ship includes the fuel gas main propulsion engine and the fuel gas generator engine, and obtains a propulsion power by using the electricity generated by the fuel gas generator engine, at a low power level. Therefore, it is possible to save a fuel cost and to solve an environmental problem. Furthermore, a separate facility for treating BOG which is produced when liquefied fuel gas is gasified may not be required, and the BOG may be used as fuel gas in the main propulsion engine 10. Furthermore, when an amount of BOG exceeding the amount to be used as fuel gas in the main propulsion engine 10 is produced, the BOG may be used as fuel gas in the generator engine 20. Therefore, the precious energy source may be reused without being discarded.

While the present invention has been described with respect to the specific embodiments, it will be apparent to those skilled in the art that various changes and modifications may be made without departing from the spirit and scope of the invention as defined in the following claims.

The invention claimed is:
1. A ship comprising:
at least one engine configured to selectively consume either or both fuel gas and fuel oil for generating power for propulsion of the ship;
at least one generator configured to consume fuel gas for generating electricity;
at least one motor configured to consume the electricity generated from the at least one generator for producing power for propulsion of the ship;
a propulsion mechanism configured to propel the ship using the propulsion power from the at least one engine or the at least one motor; and
a clutch system configured to connect or disconnect between the at least one engine and the propulsion mechanism and further configured to connect or disconnect between the at least one motor and the propulsion mechanism,
wherein when the ship is operating in a first mode requiring propulsion power below a reference level, the clutch system is configured to connect the at least one motor to the propulsion mechanism and disconnect the at least one engine from the propulsion mechanism, in which the at least one engine does not contribute to propulsion of the ship and the propulsion power comes only from the at least one motor with consumption of only the fuel gas in the at least one generator,
wherein when the ship is operating in a second mode requiring propulsion power above the reference level, the clutch system is configured to connect the at least one engine to the propulsion mechanism, in which the at least one engine contributes to propulsion of the ship with consumption of at least the fuel oil.

2. The ship according to claim 1, wherein when the ship is operating in the second mode, the at least one engine contributes to propulsion of the ship with consumption of both the fuel oil and the fuel gas.

3. The ship according to claim 1, wherein when the ship is operating in the second mode, the clutch system is further configured to disconnect the at least one motor from the propulsion mechanism, in which only the at least one engine contributes to propulsion of the ship with consumption of at least the fuel oil.

4. The ship according to claim 1, wherein the at least one engine comprises a fuel injection engine.

5. The ship according to claim 1, wherein in one operation the ship is configured such that the only the fuel oil is supplied to the at least one engine for generating the propulsion power with consumption of the fuel oil, wherein in other operation, the ship is configured such that both the fuel oil and the fuel gas are supplied to the at least one engine for generating propulsion power with consumption of the both fuel oil and the fuel gas.

6. The ship according to claim 1, further comprising a storage tank containing the fuel gas, wherein the storage tank contains boil-off gas (BOG) of the fuel gas therein, and the ship is configured to supply the BOG discharged from the storage tank to the at least one generator.

7. The ship according to claim 2, wherein the pressure of the fuel gas supplied to the at least one engine ranges from 150 to 600 bar.

8. The ship according to claim 1, wherein the at least one generator comprises one selected from the group consisting of a dual fuel (DF) engine, a gas engine, and a gas turbine.

9. The ship according to claim 1, wherein the reference level is equal to or less than 40% of the maximum power of the at least one engine.

10. The ship according to claim 1, wherein the fuel gas comprises liquefied natural gas (LNG) or liquefied petroleum gas (LPG).

11. The ship according to claim 1, wherein the fuel oil comprises diesel oil or bunker C oil.

* * * * *